United States Patent
Hedge et al.

(10) Patent No.: US 11,593,245 B2
(45) Date of Patent: Feb. 28, 2023

(54) SYSTEM, DEVICE AND METHOD FOR FROZEN PERIOD DETECTION IN SENSOR DATASETS

(71) Applicant: Siemens Energy Global GmbH & Co. KG, Munich (DE)

(72) Inventors: Gaurav Hedge, Mysore (IN); Vinay Ramanath, Bengaluru (IN); Asmi Rizvi Khaleeli, Bangalore (IN)

(73) Assignee: Siemens Energy Global GmbH & Co. KG, Munich (DE)

( * ) Notice: Subject to any disclaimer, the term of this patent is extended or adjusted under 35 U.S.C. 154(b) by 430 days.

(21) Appl. No.: 16/612,542

(22) PCT Filed: May 22, 2018

(86) PCT No.: PCT/EP2018/063366
§ 371 (c)(1),
(2) Date: Nov. 11, 2019

(87) PCT Pub. No.: WO2018/215454
PCT Pub. Date: Nov. 29, 2018

(65) Prior Publication Data
US 2020/0210305 A1    Jul. 2, 2020

(30) Foreign Application Priority Data

May 22, 2017    (EP) .................................... 17172258

(51) Int. Cl.
*G06F 11/30* (2006.01)
*H04W 4/38* (2018.01)
(Continued)

(52) U.S. Cl.
CPC ........ *G06F 11/3089* (2013.01); *G06K 9/6223* (2013.01); *H04L 67/12* (2013.01); *H04W 4/38* (2018.02)

(58) Field of Classification Search
CPC ............. G06F 11/3089; G06F 11/0751; G06K 9/6223; H04L 67/12; H04W 4/38;
(Continued)

(56) References Cited

U.S. PATENT DOCUMENTS

| 9,887,834 | B1* | 2/2018 | Molaro | G06F 3/0608 |
| 2004/0008244 | A1* | 1/2004 | Tsujimoto | G01N 21/57 |
| | | | | 347/105 |
| 2005/0229061 | A1* | 10/2005 | Kang | G06F 11/263 |
| | | | | 714/738 |
| 2012/0303321 | A1* | 11/2012 | Vass | G05B 9/02 |
| | | | | 702/179 |

(Continued)

FOREIGN PATENT DOCUMENTS

| CN | 102684936 A | 9/2012 | |
| KR | 101594510 B2 * | 2/2016 | G08C 17/02 |
| WO | WO2016190856 A1 | 12/2016 | |

OTHER PUBLICATIONS

European Search Report for European Patent Application No. 17172258.0-1954 dated Dec. 12, 2017.
(Continued)

*Primary Examiner* — Eyob Hagos
(74) *Attorney, Agent, or Firm* — Lempia Summerfield Katz LLC (57) ABSTRACT

A method is disclosed herein of detecting at least one frozen period in at least one sensor dataset associated with at least one sensor in a technical system. The method includes receiving the at least one sensor dataset in time series and computing run-lengths for the at least one sensor dataset, wherein each of the run-lengths is length of consecutive repetitions of a sensor value in the at least one sensor dataset. The method includes clustering the run-lengths into one of two clusters based on a run frequency, wherein the run frequency is a number of times the run-lengths are repeated in the at least one sensor dataset. Further, the method includes identifying a cluster from the two clusters with lower run frequency and detecting the at least one frozen period in the at least one sensor dataset based on the identified cluster.

14 Claims, 5 Drawing Sheets

(51) Int. Cl.
*G06K 9/62* (2022.01)
*H04L 67/12* (2022.01)

(58) Field of Classification Search
CPC .... F05D 2260/80; F01D 17/02; F01D 21/003; G05B 23/0221; G05B 23/0262
See application file for complete search history.

(56) References Cited

U.S. PATENT DOCUMENTS

| | | | |
|---|---|---|---|
| 2013/0086010 A1* | 4/2013 | Wenzel | G06F 11/076 707/E17.005 |
| 2014/0379301 A1* | 12/2014 | Shastri | G05B 23/0224 702/183 |
| 2015/0006972 A1 | 1/2015 | Jones | |
| 2015/0160096 A1 | 6/2015 | Patrick | |
| 2015/0309089 A1 | 10/2015 | Katsukura et al. | |
| 2016/0321323 A1* | 11/2016 | Gaumnitz | G06F 16/2272 |
| 2017/0039229 A1* | 2/2017 | Verma | G06F 16/22 |
| 2017/0117918 A1* | 4/2017 | Wei | H03M 7/6082 |

OTHER PUBLICATIONS

PCT International Search Report and Written Opinion of International Searching Authority, corresponding to PCT International Application No. PCT/EP2018/063366 dated Jun. 27, 2018.
Julien Eberle et al., "Online Unsupervised State Recognition in Sensor Data," IEEE International Conference on Pervasive Computing and Communications (PerCom), pp. 29-36 (2015).

* cited by examiner

SYSTEM, DEVICE AND METHOD FOR FROZEN PERIOD DETECTION IN SENSOR DATASETS

The present patent application is a § 371 nationalization of PCT Application Serial No. PCT/EP2018/063366, filed May 22, 2018, designating the United States, which is herein incorporated by reference. This patent application claims the priority of European patent application 17 172 258.0, filed May 22, 2017, which is also herein incorporated by reference.

TECHNICAL FIELD

This disclosure relates to automatically determining error condition in sensors provided in a technical system.

BACKGROUND

In a technical system, a sensor error condition includes a long sequence of constant values in a given time series. This long sequence mainly occurs due to "freezing" of sensors. The freezing of sensors results in the sensors being unable to quantify actual state they are measuring. In other words, freezing is a condition when the sensors are functioning but get jammed and output the same measurement for a long period of time before it gets back to normal. Such frozen periods need to be detected as they are anomalous.

Such a method of determining frozen periods in sensors is disclosed in "Online Unsupervised State Recognition in Sensor Data," Julien Eberle et al. at the IEEE International Conference on Pervasive Computing and Communications (PerCom), St. Louis, Mo., USA, 2015. The method disclosed therein determines anomaly in the sensors by converting stream of sensor data into a stream of symbols. The conversion of the sensor data is performed by using run length encoding (RLE) such that anomaly detection, forecasting, or state recognition may be carried out on the transformed data with almost no loss of accuracy. The anomaly is then detected based on a predetermined threshold. A threshold for the number of consecutive repetitions is set before hand from the knowledge of sensors. All the repetitions that are greater than this preset threshold are classified as frozen periods.

However, the above method may be disadvantageous as the predetermined threshold depends on sampling periods of the sensors. Further, the method does not address the change in threshold with change in the sensor data.

SUMMARY AND DESCRIPTION

The scope of the present disclosure is defined solely by the appended claims and is not affected to any degree by the statements within this summary. The present embodiments may obviate one or more of the drawbacks or limitations in the related art.

Therefore, it is an object of the present disclosure to detect frozen periods in sensors in a technical system without defining a predetermined threshold.

The method and system disclosed herein achieve the aforementioned object by computing run-lengths for the at least one sensor dataset. Each of the run-lengths is length of consecutive repetitions of a sensor value in the at least one sensor dataset. The run-lengths clustered into one of two clusters based on a run frequency, which is a number of times the run-lengths are repeated in the at least one sensor dataset. The method includes identifying a cluster from the two clusters with lower run frequency and detecting the at least one frozen period in the at least one sensor dataset based on the identified cluster.

According to the present disclosure, a computer implemented method of detecting one or more frozen periods in sensor datasets associated with one or more sensors in a technical system is provided. The method includes receiving a sensor dataset in time series. The sensor dataset includes data points or sensor values corresponding to at least one operation parameter associated with the technical system.

As used herein, the term "dataset"/"datasets" refers to data that a sensor records. The data recorded by the sensor is for a particular period of time. In the present embodiment, the sensor records the data in time series. The dataset includes multiple data points, each representing a recording of the electronic device. As used herein, "sensor value" and "data point" are used interchangeably to mean a representation of one or more datums recorded for the at least one operative parameter associated with the technical system. The "at least one operation parameter" refers to one or more characteristics of the technical system. For example, if a gas turbine is the technical system, the at least one operation parameter includes combustion temperature, inlet pressure, exhaust pressure, etc.

The method employs a sensor monitoring device for detecting the frozen periods. The sensor monitoring device includes a receiver to receive one or more sensor datasets in time series. Each of the one or more sensor datasets may relate to an individual operation parameter of the technical system. The sensor monitoring device also includes a processor and a memory communicatively coupled to the processor. The memory includes a computational unit to compute run-lengths for the sensor dataset. As used herein, "run-lengths" refers to length of consecutive repetitions of a sensor value in the sensor dataset. The sensor dataset may include a plurality of sensor values that may be repetitive or unique. Accordingly, consecutive repetitions of the sensor values are counted and defined as run-lengths. For example, if there are seven consecutive repetitions of the sensor values, the run-length will be seven.

According to an embodiment, the computational unit identifies the consecutive repetitions of the sensor value in the sensor dataset and counts the number of the consecutive repetitions. Further, the run-lengths are computed by determining number of the consecutive repetitions of the sensor value. The computational unit also lists the repeating sensor value.

The sensor monitoring device also includes a cluster module to cluster the run-lengths into one of two clusters based on a run frequency. As used herein, the "run frequency" is a number of times the run-lengths are repeated in the sensor dataset.

According to an embodiment, the cluster module includes a run frequency module to determine the run frequency of each run-length. The run frequency module counts the number of times the run-length is repeated in the sensor dataset. Considering the example of 7 consecutive repetitions of the sensor values, the run-length is 7. If there are 10 sets of such consecutive repetitions with run-length 7, the run frequency will be 10.

The cluster module also identifies a cluster from the two clusters with lower run frequency. For example, consider that the sensor dataset includes run-lengths 4, 6, 9, and 11 with run frequency 50, 36, 17, and 10, respectively. The cluster module works on the assumption that the run-lengths with higher run frequency are un-anomalous as compared to run-lengths with low run frequency. Accordingly, in the above example, the run-lengths 4 and 6 with higher run frequency 50 and 36 are clustered and the run lengths 9 and 11 are clustered. The cluster module then identifies the cluster with run-lengths 9 and 11 having low run frequency 17 and 10, respectively. The sensor monitoring device also includes a detection module to detect the frozen periods the identified cluster. Accordingly, the run-lengths 9 and 11 and the associated sensor values are detected as frozen periods and therefore anomalous.

In another embodiment, the cluster module clusters the run-lengths based on a cluster centroid. Considering the previous example of run-lengths 4, 6, 9, and 11, there are two cluster centroids generated, a lower cluster centroid of 5 and a higher cluster centroid of 10. This distinction between the clusters is determined by a K-means clustering algorithm that is made by comparing mean of the clusters.

The cluster module then identifies the cluster with the higher cluster centroid and the detection module detects the frozen periods in the higher cluster centroid. As used herein, "frozen period" refers to a long sequence of constant values in a given time series, which may occur due to "freezing" or jamming of sensors. The freezing of sensors results in the sensors being unable to quantify actual parameters they are measuring, and a repetitive value is output. In an embodiment, the detection module detects the frozen period in the higher cluster centroid after run-length encoding is performed by the computational unit and k-means clustering is performed by the cluster module.

According to a yet another embodiment, the computational unit includes a minimum discount module that defines a minimum discount length for the sensor dataset. The minimum discount length is a number of allowed consecutive repetitions. In other words, the minimum discount length is the number of consecutive repetitions that are accepted before the sensor values may be detected as frozen period. The minimum discount length is done based on the assumption that the sensor was giving out correct measurement at an instant before it gets jammed and repeated the same measurement for longer than expected time. Accordingly, the computational unit computes the run-lengths for the sensor dataset after subtracting the minimum discount length from each of the consecutive repetitions by a subtraction module. The minimum discount length is configurable by a user based on the technical system and therefore, the present disclosure is advantageously flexible.

According to an embodiment, the sensor monitoring device includes a minimum run-length module to define a minimum run-length for the frozen period. The minimum run-length acts as a predetermined threshold and if the run-length exceeds the minimum run-length the frozen period is detected. Accordingly, the minimum run-length module detects the at least one frozen period when the consecutive repetitions in the sensor dataset exceeds the minimum run-length.

A system is also provided for detecting one or more frozen periods in the sensor dataset. The system includes a server and a network interface communicatively coupled to the server. Further, one or more technical system is communicatively coupled to the server via the network interface. In an embodiment, the server is a cloud server that communicates with the technical system via the network interface. The server includes the sensor monitoring device for detecting one or more frozen periods in the sensor dataset associated with a sensor in the technical system. For example, when a gas turbine is the technical system, the sensor is one of a plurality of turbine engine sensors such as compressor pressure sensor, inlet pressure sensor, combustion temperature sensor, etc. The sensor generates the sensor dataset including sensor values corresponding to at least one operation parameter associated with the technical system. Considering the example of the gas turbine, the inlet pressure sensor generates the sensor dataset including pressure values associated with the inlet pressure of the gas turbine.

The present disclosure for frozen period detection is robust and efficient as the detection of frozen periods is unsupervised, without a preset threshold of maximum acceptable repetitions. Further, the only input required is a sensor dataset in time series. Run Length Encoding technique is performed to detect repetitions and K-means clustering is performed on the repetitions to identify the frozen periods by inspecting each of the cluster mean. The cluster with the greatest mean would hold the repetitions that are detected as the frozen periods. Furthermore, the Run Length Encoding technique and K-means clustering on repetitions are computationally efficient.

BRIEF DESCRIPTION OF THE DRAWINGS

The above-mentioned and other features of the disclosure will now be addressed with reference to the accompanying drawings. The illustrated embodiments are intended to illustrate, but not limit the disclosure.

The present disclosure is further described hereinafter with reference to illustrated embodiments shown in the accompanying drawings, in which.

DETAILED DESCRIPTION

Various embodiments are described with reference to the drawings, wherein like reference numerals are used to refer to like elements throughout. In the following description, a large gas turbine has been considered as an example of a technical system for the purpose of explanation. Further, numerous specific details are set forth in order to provide thorough understanding of one or more embodiments of the present disclosure. These examples must not be considered to limit the application of the disclosure to large gas turbine and includes any technical system for sensor frozen period is automatically determined. It may be evident that such embodiments may be practiced without these specific details.

Figure 1:
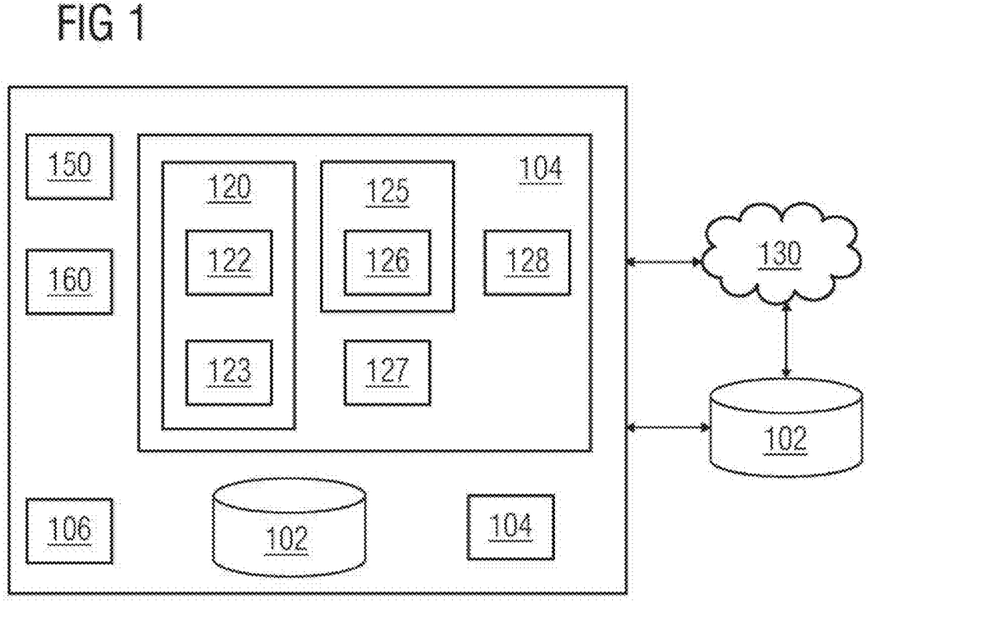
FIG. 1 illustrates an example of a sensor monitoring device for detecting frozen periods in a sensor dataset associated with a sensor in a technical system.

FIG. 1 illustrates a sensor monitoring device 100 for detecting frozen periods in a sensor dataset associated with a sensor in a technical system. The technical system used for explaining is a large gas turbine. However, it is not limited to a large gas turbine and may include any system with multiple sensors. The sensor monitoring device 100 is installed on and accessible by a user device, for example, a personal computing device, a workstation, a client device, a network enabled computing device, any other suitable computing equipment, and combinations of multiple pieces of computing equipment. The sensor monitoring device 100 disclosed herein is in operable communication with a database 102 over a communication network 130.

The database 102 is, for example, a structured query language (SQL) data store or a not only SQL (NoSQL) data store. In an embodiment, the database 102 may also be a location on a file system directly accessible by the sensor monitoring device 100. In another embodiment, the database 102 is configured as cloud based database implemented in a cloud computing environment, where computing resources are delivered as a service over the network 130. As used herein, a "cloud computing environment" refers to a processing environment including configurable computing physical and logical resources, for example, networks, servers, storage, applications, services, etc., and data distributed over the network 130, for example, the internet. The cloud computing environment provides on-demand network access to a shared pool of the configurable computing physical and logical resources. The communication network 130 is, for example, a wired network, a wireless network, a communication network, or a network formed from any combination of these networks.

In an embodiment, the sensor monitoring device 100 is downloadable and usable on the user device. In another embodiment, the sensor monitoring device 100 is configured as a web based platform, for example, a website hosted on a server or a network of servers. In another embodiment, the sensor monitoring device 100 is implemented in the cloud computing environment. The sensor monitoring device 100 is developed, for example, using Google App engine cloud infrastructure of Google Inc., Amazon Web Services® of Amazon Technologies, Inc., as disclosed hereinafter in FIG. 2. In an embodiment, the sensor monitoring device 100 is configured as a cloud computing based platform implemented as a service for analyzing data.

The sensor monitoring device 100 disclosed herein includes memory 104 and at least one processor 106 communicatively coupled to the memory 104. As used herein, "memory" refers to all computer readable media, for example, non-volatile media, volatile media, and transmission media except for a transitory, propagating signal. The memory is configured to store computer program instructions defined by modules, for example, 120, 125, 127, 128, etc., of the sensor monitoring device 100. The processor 106 is configured to execute the defined computer program instructions in the modules. Further, the processor 106 is configured to execute the instructions in the memory 104 simultaneously. As illustrated in FIG. 1, the sensor monitoring device 100 includes a receiver 150 to receive the sensor dataset in time series and a display unit 160. Additionally, a user using the user device may access the sensor monitoring device 100 via a GUI (graphic user interface). The GUI is, for example, an online web interface, a web based downloadable application interface, etc.

The modules executed by the processor 106 include a computational unit 120, a cluster module 125, a minimum run-length module 127, and a detection module 128. The sensor dataset received by the receiver 150 is used to compute run-lengths. As used herein "run-lengths" refers to length of consecutive repetitions of a sensor value in the sensor dataset. The sensor dataset may include a plurality of sensor values that may be repetitive or unique. Accordingly, consecutive repetitions of the sensor values are counted and defined as run-lengths. For example, if there are seven consecutive repetitions of the sensor values, the run-length will be seven.

The computational unit 120 includes a minimum discount module 122 and a subtraction module 123. The minimum discount module 122 defines a minimum discount length for the sensor dataset. The minimum discount length refers to a number of allowed consecutive repetitions. For example, the minimum discount length may be 2, which means that the determination of the run-length is done only after 2 repetitions are discounted from the total number of consecutive repetitions. In an embodiment, after detecting the frozen periods, the minimum discount module 122 allots a relax time to the sensor values in the frozen period. In other words, a number of consecutive repetitions are denoted as accepted before the frozen period is determined. The minimum discount length may be input by a user based on the assumption that the sensor was generating correct sensor values at an instant before it entered the "frozen" state. The computational unit 120 also includes a subtraction module to subtract the minimum discount length from the consecutive repetitions.

In addition to the computational unit 120, the processor also executes the cluster module 125. When the cluster module 125 is executed, the run-lengths are clustered into one of two clusters based on a run frequency. The run frequency refers to a number of times the run-lengths are repeated in the sensor dataset. The run frequency module 126 in the cluster module 125 counts the number of times the run-length is repeated in the sensor dataset. For example, if there are 7 consecutive repetitions of the sensor value, the run-length is 7. If there are 10 sets of such consecutive repetitions with run-length 7, the run frequency will be 10.

The cluster module 125 also identifies a cluster with lower run frequency from the two clusters. The cluster module 125 works on the assumption that the run-lengths with higher run frequency are un-anomalous as compared to run-lengths with low run frequency. Accordingly, the cluster module 125 then identifies the cluster with low run frequency as anomalous. Based on the cluster identified by cluster module 125 the detection module 128 detects the frozen period.

The sensor monitoring device 100 also includes the minimum run-length module 127 to define a minimum run-length for the frozen period. The minimum run-length is a predetermined threshold of a number of consecutive repetitions beyond which the frozen period is detected. The minimum run-length module 127 is optionally executed as it requires knowledge of the minimum run-length.

Figure 2:
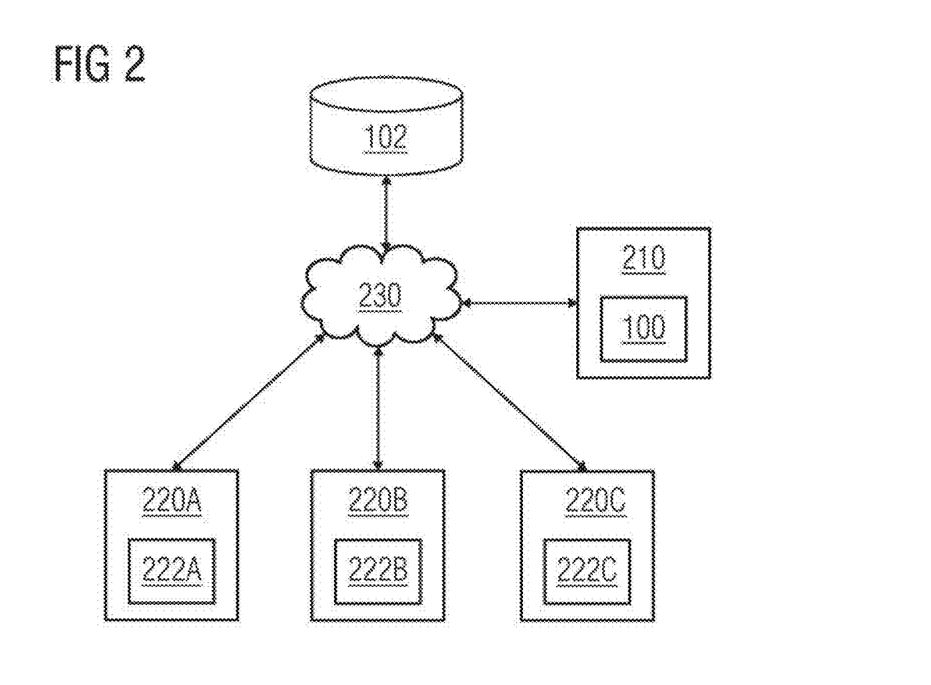
FIG. 2 illustrates an example of a system including a server including the sensor monitoring device in FIG. 1.

FIG. 2 illustrates a system 200 including a server 210 including the sensor monitoring device 100 in FIG. 1. The system 200 also includes a network interface 230 communicatively coupled to the server 210 and technical systems 220A-220C communicatively coupled to the server 210 via the network interface 230. The server 210 includes the sensor monitoring device 100 for detecting one or more frozen periods in sensor dataset associated with one or more sensor associated with the technical systems 220A-220C. The technical systems 220A-220C are located in a remote location while the server 210 is located on a cloud server for example, using Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc. The technical systems 220A, 220B, and 220C include sensors 222A, 222B, and 222C, respectively. The sensors 222A, 222B, and 222C are used to generate one or more sensor datasets including sensor values corresponding to one or more operation parameters associated with the technical systems 220A, 220B, and 220C.

Figure 3:
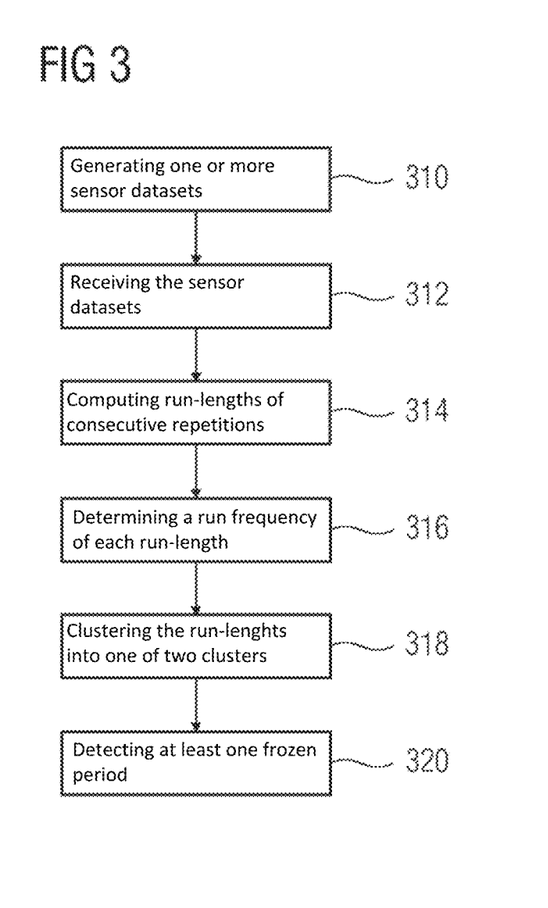
FIG. 3 is a flowchart illustrating an example of a method of operation of the sensor monitoring device of FIG. 1.

The operation of the sensor monitoring device 100 and the system 200 is further explained by a flowchart in FIG. 2. The method begins at act 310, wherein the act includes generating one or more sensor datasets including sensor values corresponding to one or more operation parameter associated with the technical system. The sensor value refers to a representation of one or more datums recorded for the at least one operative parameter associated with the technical system. The "operation parameter" refers to one or more characteristics of the technical system. For example, if a gas turbine is the technical system, the at least one operation parameter includes combustion temperature, inlet pressure, exhaust pressure, etc. Accordingly, the inlet pressure sensor generates the sensor dataset including pressure values associated with the inlet pressure of the gas turbine.

At act 312, the sensor datasets are received by a receiver of a sensor monitoring device as disclosed in FIG. 1. The sensor datasets are received in time series. At act 314, run-lengths of consecutive repetitions in the sensor datasets are computed. The run-length is computed by run-length encoding, which is compression algorithm to compute the run-lengths and sensor values of the consecutive repetitions. Computing the run-lengths also includes determining a minimum discount length and subtracting the minimum discount length from the consecutive repetitions while computing the run-length.

At act 316, a run frequency of each of the run-lengths is determined by computing number of times each of the run-length is repeated in the sensor datasets. For example, if a run-length 7 is repeated 10 times, the run frequency will be 10. Based on the run frequency, the clustering of the run-lengths is performed in act 318.

At act 318, the run-lengths are clustered into one of two clusters. The clusters include an un-anomalous cluster and an anomalous cluster. The run-lengths with high run frequency are clustered in the un-anomalous cluster and the run-lengths with low run frequency are clustered in the anomalous cluster. This is because the run-lengths that occur frequently in the sensor datasets are considered as part of the functioning of the sensors. As a corollary to clustering by run frequency, the clustering may also be done by determining the highest centroid in each of the two clusters and comparing the centroids to determine the anomalous cluster.

At act 320, once the anomalous cluster is identified, the frozen periods are detected and displayed on a display unit of the sensor monitoring device. The following plots illustrate the working of the method disclosed in FIG. 3. The technical system for the purpose of the below plots is a large gas turbine.

Figure 4:
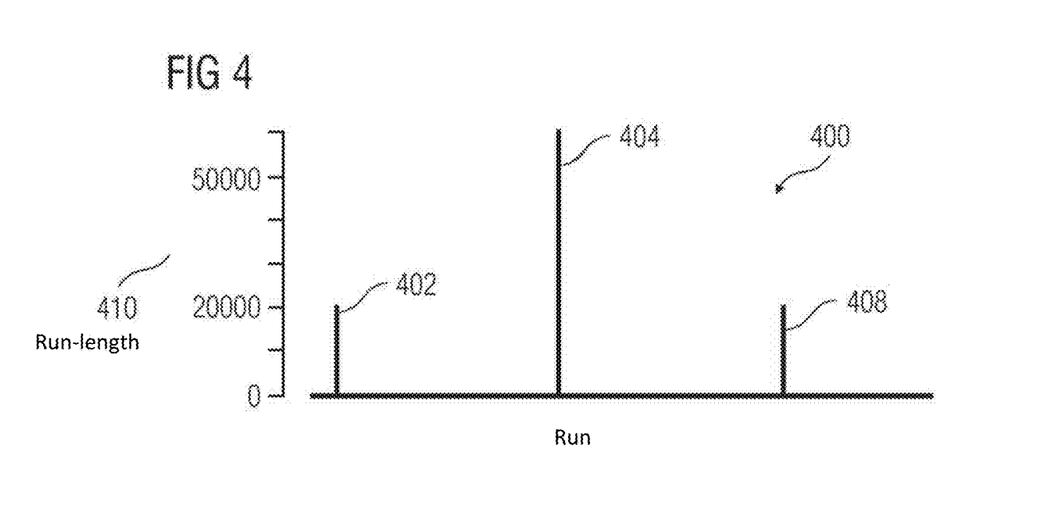
FIG. 4 is an example of a plot of run-lengths of consecutive repetitions in a compressor outlet pressure dataset.
Figure 5:
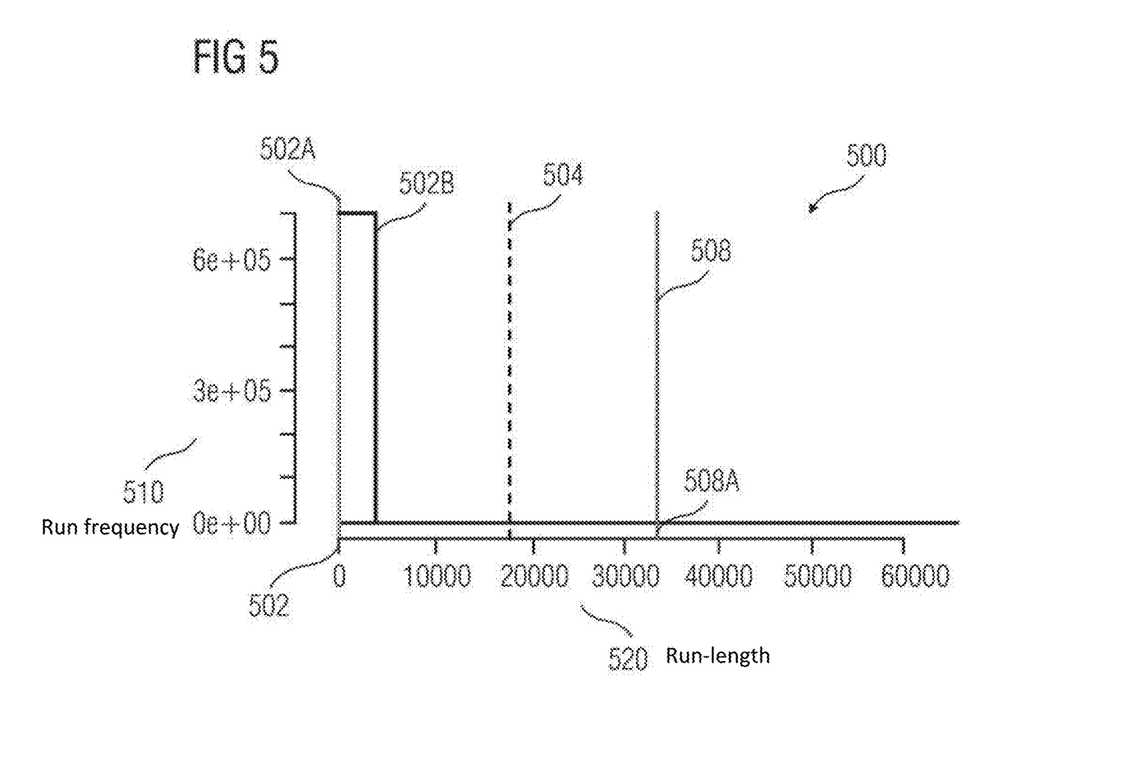
FIG. 5 is an example of a plot of run frequency for the run-lengths indicated in FIG. 4.
Figure 6:
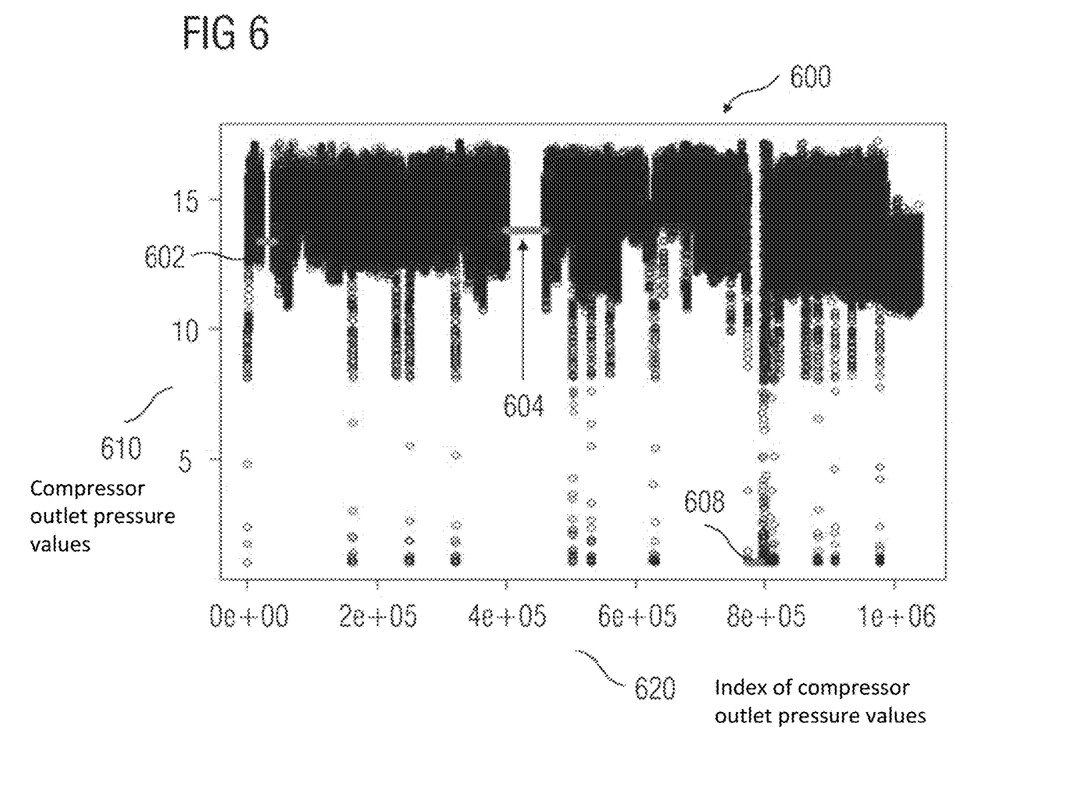
FIG. 6 is an example of a plot of frozen periods detected in the compressor outlet pressure dataset.

For the purpose of plots in FIG. 4-FIG. 6, compressor outlet pressure values recorded in time series are considered. The compressor outlet pressure values are generated from a compressor pressure sensor associated with the large gas turbine. The compressor outlet pressure values are received as a compressor outlet pressure dataset by a receiver of a sensor monitoring device.

FIG. 4 is a plot 400 of run-lengths of consecutive repetitions in the compressor outlet pressure dataset. The y-axis 410 indicates measure of the run-lengths 402, 404 and 408 for the consecutive repetitions. After the run-lengths 402, 404 and 408 are determined, two clusters of the run-lengths are formed, one with lesser run frequency and one with higher run frequency.

FIG. 5 is a plot 500 of run frequency for the run-lengths 402, 404 and 408. The run frequency is indicated on the y-axis 510 and the run-length is indicated on the x-axis 520. The centroid of the clusters is determined by k-means clustering. As shown in FIG. 5, the centroid 502a is the point where line 502b intersects run-length 502 on the real line, e.g., at x~1.35. Further, centroid 508a lies at x~33405.33 shown by line 508. Furthermore, the k-means clustering clusters the run-lengths by a decision boundary as indicated by line 504.

FIG. 6 is a plot 600 of frozen periods detected in the compressor outlet pressure dataset. The x-axis 620 is the index of the compressor outlet pressure values and the y-axis 610 is the measure of each of the compressor outlet pressure values. As shown in FIG. 6, the frozen periods are indicated at 602, 604, and 608. For example, at 602, the index of the compressor outlet pressure value is 20360 with 19641 consecutive repetitions. At 604, the index is 400259 with 59642 consecutive repetitions. Further, at 608, the index is 773698 with 19853 consecutive repetitions.

Figure 7A:
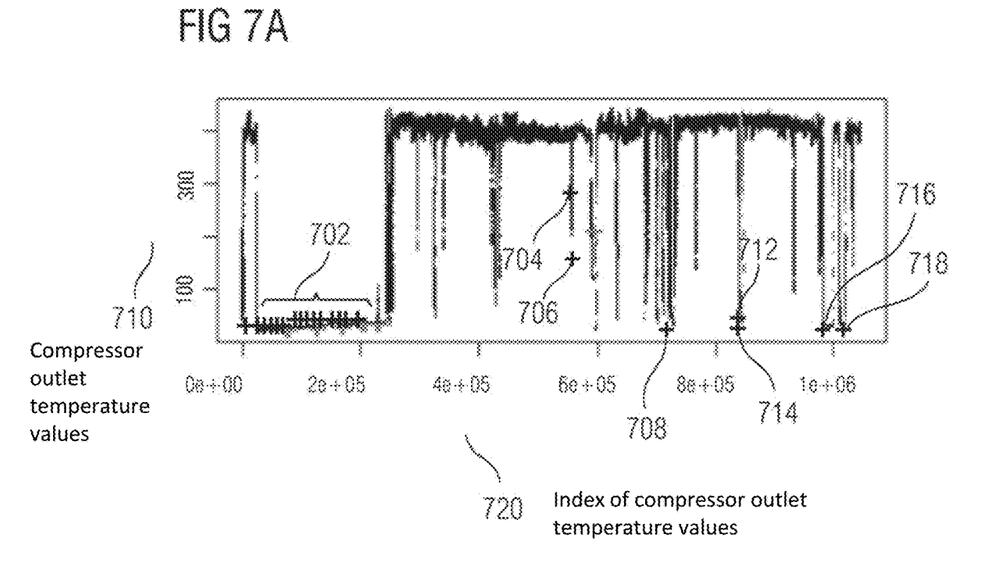
FIG. 7A is an example of a plot of frozen periods in compressor outlet temperature dataset without determination of minimum discount length.

FIG. 7A is a plot 700A of frozen periods in compressor outlet temperature dataset without determination of minimum discount length. The compressor outlet temperature dataset includes compressor outlet temperature values recorded in time series from a temperature sensor at a compressor outlet in the large gas turbine. The y-axis 710 indicates measure of the compressor outlet temperature values and the x-axis 720 indicates index of each of the compressor outlet temperature values. As shown in FIG. 7, the frozen periods detected are 702-708 and 712-718.

Figure 7B:
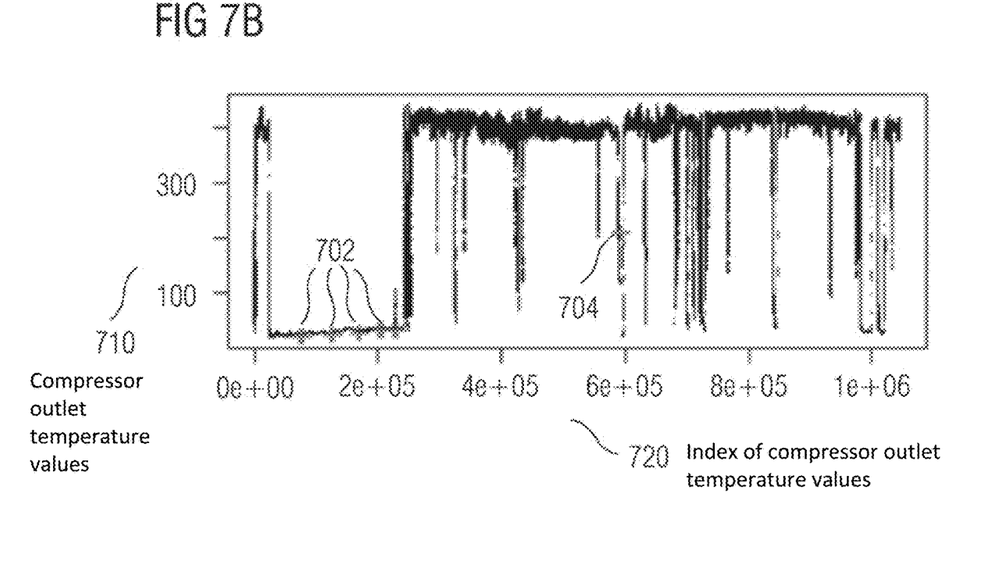
FIG. 7B is an example of a plot of the frozen periods in compressor outlet temperature dataset after determination of the minimum discount length.

FIG. 7B is a plot 700B of the frozen periods in compressor outlet temperature dataset after determination of the minimum discount length. The minimum discount length is a number of allowed consecutive repetitions in the compressor outlet temperature dataset. In other words, the minimum discount length is the number of consecutive repetitions that are accepted before the compressor outlet temperature sensor may be detected as frozen. The minimum discount length is done based on the assumption that the temperature sensor was giving out correct measurement at an instant before it gets jammed and repeated the same measurement for longer than expected time. Once the minimum discount length is applied, only the frozen periods 702 and 704 remain as compared to the frozen periods 702-708 and 712-718 as detected in FIG. 7A.

It will be readily apparent that the various methods, algorithms, and modules disclosed herein may be implemented on computer readable media appropriately programmed for computing devices. The modules that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the modules including computer executable instructions may be implemented in any programming language. The modules may be stored on or in one or more mediums as object code. Various aspects of the method and system disclosed herein may be implemented in a non-programmed environment including documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof.

Where databases including data points are described, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries may be different from those disclosed herein. Further, despite any depiction of the databases as tables, other formats including relational databases, object-based models, and/or distributed databases may be used to store and manipulate the data types disclosed herein. Likewise, object methods or behaviors of a database may be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present disclosure may be configured to work in a network environment including one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices includes processors, some examples of which are disclosed above, that are configured to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

The present disclosure is not limited to a particular computer system platform, processor, operating system, or network. One or more aspects of the present disclosure may be distributed among one or more computer systems, for example, servers configured to provide one or more services to one or more client computers, or to perform a complete task in a distributed system. For example, one or more aspects of the present disclosure may be performed on a client-server system that includes components distributed among one or more server systems that perform multiple functions according to various embodiments. These components include, for example, executable, intermediate, or interpreted code, which communicate over a network using a communication protocol. The present disclosure is not limited to be executable on any particular system or group of systems, and is not limited to any particular distributed architecture, network, or communication protocol.

The foregoing examples have been provided merely for the purpose of explanation and are in no way to be construed as limiting of the present disclosure. While the disclosure has been described with reference to various embodiments, it is understood that the words, which have been used herein, are words of description and illustration, rather than words of limitation. Further, although the disclosure has been described herein with reference to particular means, materials, and embodiments, the disclosure is not intended to be limited to the particulars disclosed herein; rather, the disclosure extends to all functionally equivalent structures, methods and uses, such as are within the scope of the appended claims. Those skilled in the art, having the benefit of the teachings of this specification, may affect numerous modifications thereto and changes may be made without departing from the scope and spirit of the disclosure in its aspects.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A computer-implemented method of detecting at least one frozen period in at least one sensor dataset associated with at least one sensor in a technical system, the method comprising:

receiving, by at least one processor of a sensor monitoring device of the technical system, the at least one sensor dataset in time series;

computing, by the at least one processor, run-lengths for the at least one sensor dataset, wherein each of the run-lengths is a length of consecutive repetitions of a sensor value in the at least one sensor dataset;

clustering, by the at least one processor, the run-lengths into two clusters based on a run frequency such that a first portion of the run-lengths are clustered into a first cluster and a second portion of the run-lengths are clustered into a second cluster, wherein the run frequency is a number of times the run-lengths are repeated in the at least one sensor dataset;

identifying, by the at least one processor, a cluster from the two clusters with a lower run frequency;

detecting, by the at least one processor, the at least one frozen period in the at least one sensor dataset based on the identified cluster; and displaying, by a display unit of the technical system, the detected at least one frozen period, therein providing an indication that a sensor of the at least one sensor is jammed and measurements of the sensor are anomalous, wherein the technical system comprises a gas turbine, and wherein the at least one sensor comprises a compressor sensor, an inlet pressure sensor, or a combustion temperature sensor.

2. The method of claim 1, wherein the computing of the run-lengths for the at least one sensor dataset comprises:
identifying the consecutive repetitions of the sensor value in the at least one sensor dataset; and
computing the run-lengths by determining a number of the consecutive repetitions of the sensor value.

3. The method of claim 2, wherein the computing of the run-lengths by determining the number of the consecutive repetitions of the sensor value comprises:
defining a minimum discount length for the at least one sensor dataset, wherein the minimum discount length is a number of allowed consecutive repetitions; and
computing the run-lengths for the at least one sensor dataset after subtracting the minimum discount length from each of the consecutive repetitions.

4. The method of claim 1, further comprising:
defining a minimum run-length for the at least one frozen period; and
detecting the at least one frozen period when the consecutive repetitions in the at least one sensor dataset exceed the minimum run-length.

5. The method of claim 1, wherein the clustering of the run-lengths into the two clusters based on the run frequency comprises:
determining the run frequency by computing the number of each of the run-lengths in the at least one sensor dataset; and
clustering the run-lengths into the two clusters based on the run frequency, wherein the two clusters comprise an un-anomalous cluster of the run-lengths with a higher run frequency and an anomalous cluster of the run-lengths with the lower run frequency.

6. The method of claim 1, further comprising:
generating the at least one sensor dataset comprising sensor values corresponding to at least one operation parameter associated with the technical system.

7. The method of claim 1, further comprising:
recording, by the at least one sensor in the technical system, the at least one sensor dataset comprising sensor values corresponding to at least one operation parameter associated with the at least one technical system.

8. A sensor monitoring device for detecting at least one frozen period in at least one sensor dataset associated with at least one sensor in a technical system, the sensor monitoring device comprising:
a receiver configured to receive the at least one sensor dataset in time series;
at least one processor;
a display unit; and
a memory communicatively coupled to the at least one processor, wherein the memory and the at least one processor are configured to:
compute run-lengths for the at least one sensor dataset, wherein each of the run-lengths is length of consecutive repetitions of a sensor value in the at least one sensor dataset;
cluster the run-lengths into two clusters based on a run frequency such that a first portion of the run-lengths are clustered into a first cluster and a second portion of the run-lengths are clustered into a second cluster, wherein the run frequency is a number of times the run-lengths are repeated in the at least one sensor dataset;
identify a cluster with lower run frequency from the two clusters; and
detect the at least one frozen period in the at least one sensor dataset based on the identified cluster,
wherein the display unit is configured to display the detected at least one frozen period, therein providing an indication that a sensor of the at least one sensor is jammed and measurements of the sensor are anomalous,
wherein the technical system comprises a gas turbine, and
wherein the at least one sensor comprises a compressor sensor, an inlet pressure sensor, or a combustion temperature sensor.

9. The sensor monitoring device of claim 8, wherein the memory and the at least one processor are further configured to:
define a minimum discount length for the at least one sensor dataset, wherein the minimum discount length is a number of allowed consecutive repetitions; and
compute the run-lengths for the at least one sensor dataset after subtracting the minimum discount length from each of the consecutive repetitions.

10. The sensor monitoring device of claim 8, wherein the memory and the at least one processor are further configured to:
define a minimum run-length for the at least one frozen period; and
detect the at least one frozen period when the consecutive repetitions in the at least one sensor dataset exceed the minimum run-length.

11. The sensor monitoring device of claim 8, wherein the memory and the at least one processor are further configured to:
determine the run frequency by computing the number of each of the run-lengths in the at least one sensor dataset; and
cluster the run-lengths into the two clusters based on the run frequency,
wherein the two clusters comprise an un-anomalous cluster of the run-lengths with a higher run frequency and an anomalous cluster of the run-lengths with the lower run frequency.

12. A system for detecting at least one frozen period in at least one sensor dataset, the system comprising:
a server;
a network interface communicatively coupled to the server;
a display unit; and
at least one technical system communicatively coupled to the server via the network interface,
wherein the at least one technical system comprises a gas turbine,
wherein the server comprises a sensor monitoring device having:
a receiver configured to receive the at least one sensor dataset in time series;
at least one processor; and
a memory communicatively coupled to the at least one processor, the memory and the at least one processor configured to:
compute run-lengths for the at least one sensor dataset, wherein each of the run-lengths is length of consecutive repetitions of a sensor value in the at least one sensor dataset;
cluster the run-lengths into two clusters based on a run frequency such that a first portion of the run-lengths are clustered into a first cluster and a second portion of the run-lengths are clustered into a second cluster, wherein the run frequency is a number of times the run-lengths are repeated in the at least one sensor dataset, and identify a cluster with lower run frequency from the two clusters; and detect the at least one frozen period in the at least one sensor dataset based on the identified cluster, wherein the display unit is configured to display the detected at least one frozen period, therein providing an indication that a sensor is jammed and measurements of the sensor are anomalous, and wherein the sensor comprises a compressor sensor, an inlet pressure sensor, or a combustion temperature sensor.

13. The system of claim 12, wherein the at least one technical system comprises at least one sensor configured to generate the at least one sensor dataset comprising sensor values corresponding to at least one operation parameter associated with the at least one technical system.

14. The system of claim 13, wherein the at least one sensor comprises one of a plurality of turbine engine sensors.

* * * * *